United States Patent
Choi

(10) Patent No.: US 7,661,540 B2
(45) Date of Patent: Feb. 16, 2010

(54) METHOD OF FORMING SPACED PLEATED FILTER MATERIAL AND PRODUCT OF SAME

(75) Inventor: Kyung-Ju Choi, Jefferson County, KY (US)

(73) Assignee: AAF McQuay, Inc., Louisville, KY (US)

( * ) Notice: Subject to any disclaimer, the term of this patent is extended or adjusted under 35 U.S.C. 154(b) by 125 days.

(21) Appl. No.: 10/748,365

(22) Filed: Dec. 30, 2003

(65) Prior Publication Data

US 2005/0139544 A1    Jun. 30, 2005

(51) Int. Cl.
 *B01D 27/06* (2006.01)
(52) U.S. Cl. .......................... 210/488; 55/482; 55/497; 55/498; 55/521; 210/493.1; 210/493.5
(58) Field of Classification Search .................. 55/521, 55/524, 527, 498, 501, 482, 486, 497; 210/483, 210/488, 493.1, 497, 494.3, 506, 493.5, 494.1, 210/335
See application file for complete search history.

(56) References Cited

U.S. PATENT DOCUMENTS

| | | | |
|---|---|---|---|
| 3,531,920 A | 10/1970 | Hart | 55/497 |
| 3,849,314 A * | 11/1974 | Niccum et al. | 210/493.1 |
| 4,954,255 A * | 9/1990 | Muller et al. | 210/437 |
| 5,028,331 A | 7/1991 | Lippold | 210/493.5 |
| 5,053,131 A | 10/1991 | Lippold | 210/493.5 |
| 5,066,319 A | 11/1991 | Lippold | 55/521 |
| 5,071,555 A | 12/1991 | Enbom | 210/493.5 |
| 5,089,202 A | 2/1992 | Lippold | 264/145 |
| 5,156,780 A * | 10/1992 | Kenigsberg et al. | 264/424 |
| 5,290,447 A | 3/1994 | Lippold | 210/493.1 |
| 5,306,321 A | 4/1994 | Osendorf | 55/487 |
| 5,427,597 A | 6/1995 | Osendorf | 55/487 |
| 5,505,852 A * | 4/1996 | van Rossen | 210/493.3 |
| 5,804,014 A | 9/1998 | Kahler | 156/204 |
| 5,888,262 A * | 3/1999 | Kahler | 55/497 |
| 5,993,501 A * | 11/1999 | Cusick et al. | 55/486 |
| 6,159,318 A | 12/2000 | Choi | 156/167 |
| 6,165,241 A * | 12/2000 | Choi | 55/521 |
| 6,165,242 A | 12/2000 | Choi | 55/524 |
| 6,254,653 B1 | 7/2001 | Choi | 55/497 |
| 6,398,839 B2 | 6/2002 | Choi | 55/499 |
| 2002/0033244 A1 | 3/2002 | Schlecht et al. | |

\* cited by examiner

*Primary Examiner*—Joseph W Drodge
(74) *Attorney, Agent, or Firm*—James E. Cole; John F. Salazar; Middleton Reutlinger

(57) ABSTRACT

A unified pleated filter arrangement including a unified method and product wherein successive pleat flanks are spaced by communicably facing increments of spacing material with the pleat flanks being a selectively spaced and uniformly level geometric configuration.

28 Claims, 8 Drawing Sheets

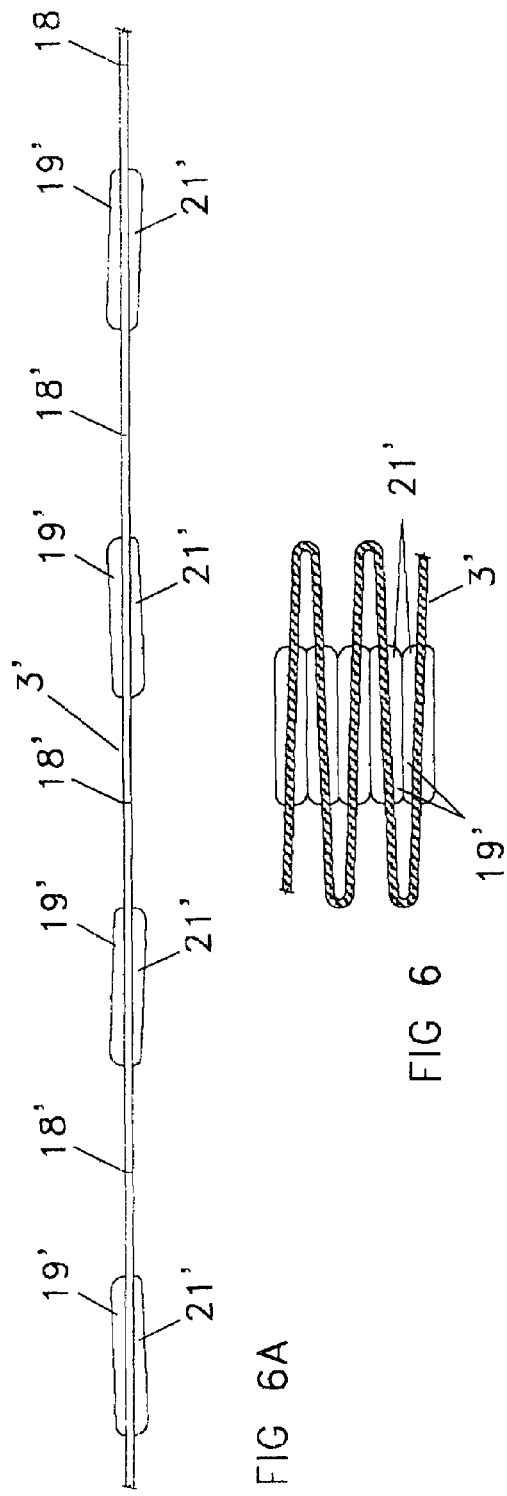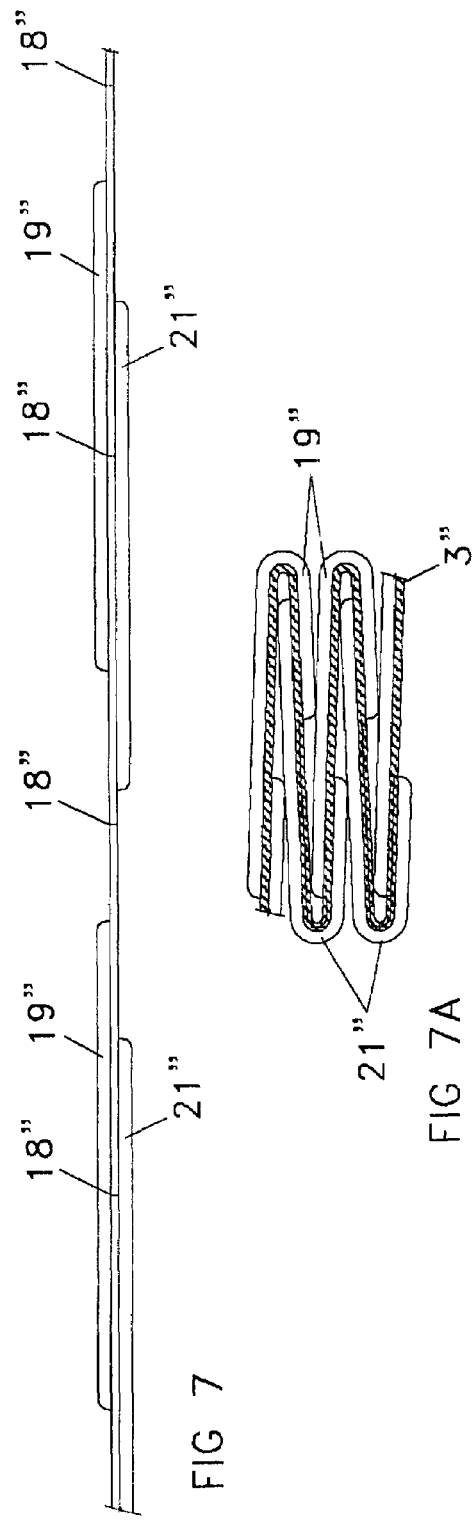

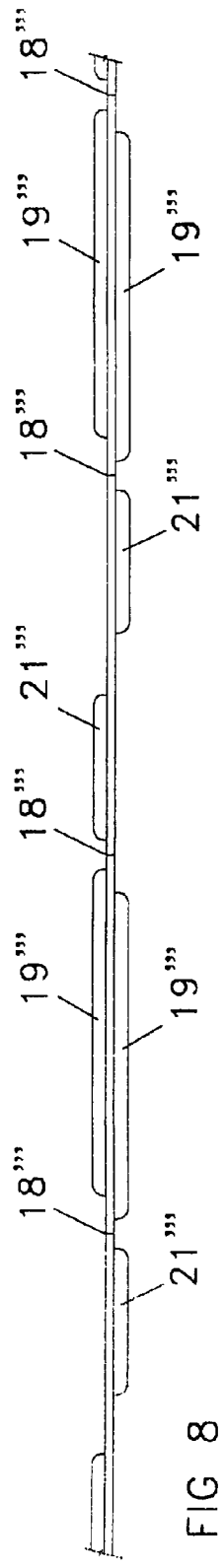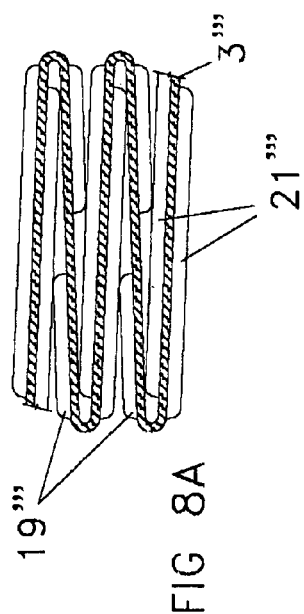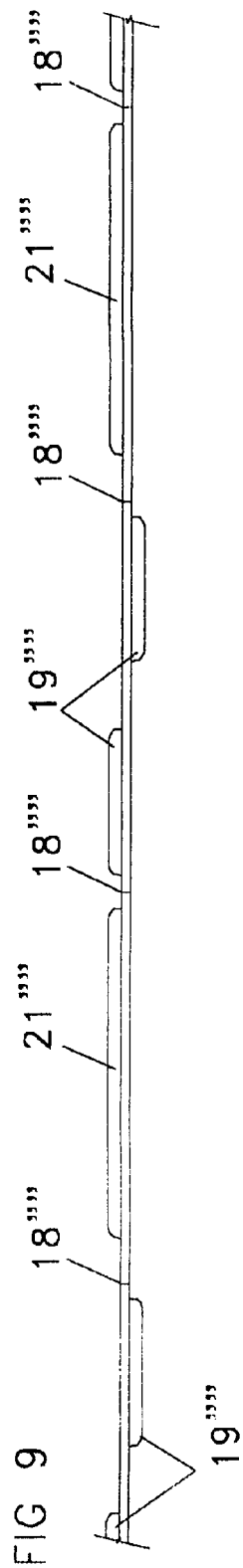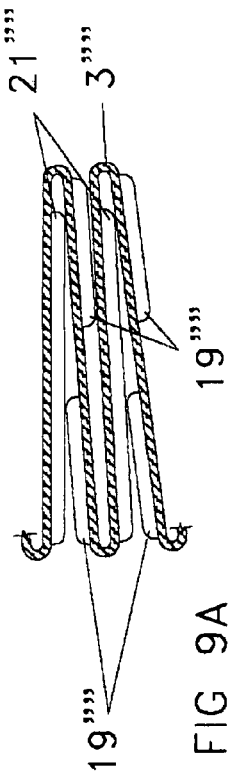
FIG 8
FIG 8A
FIG 9
FIG 9A

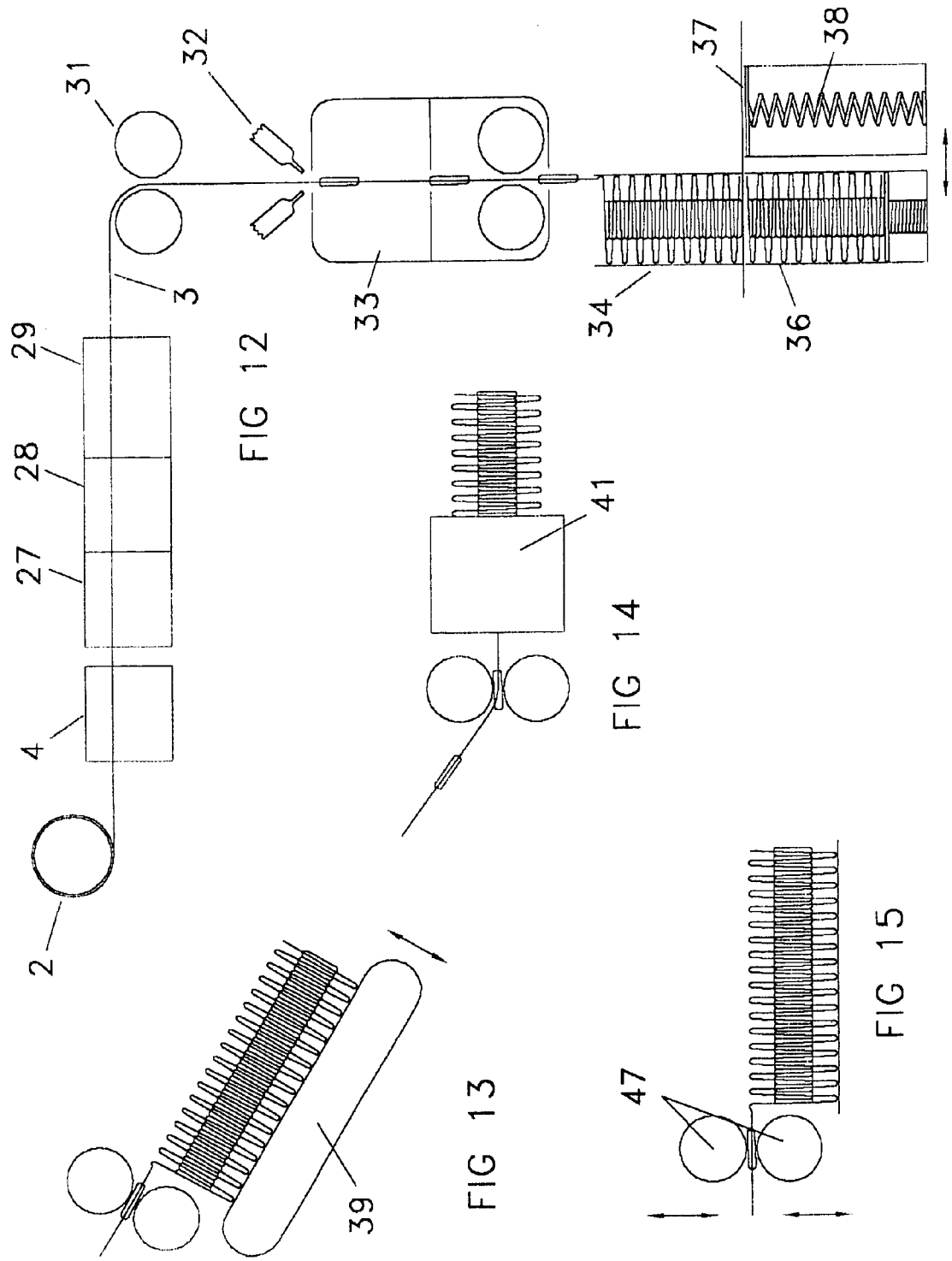

US 7,661,540 B2

1

METHOD OF FORMING SPACED PLEATED FILTER MATERIAL AND PRODUCT OF SAME

BACKGROUND OF THE INVENTION

The present invention relates to fluid filter media and more particularly to a unique and novel arrangement for uniformly forming and spacing the pleats of pleated filter material and a novel unified pleated filter product produced by the inventive method set forth herein.

Various arrangements are known in the filtration art for forming pleated filter media material and spacing the successive pleats in geometrically configured planar and cylindrical cartridges produced by such forming arrangements. In this regard, attention is directed to some of the prior art noted in the related U.S. patent application Ser. No. 10/317,437, filed on Dec. 12, 2002 by Kyung-Ju Choi, now U.S. Pat. No. 7,097,684. More specifically, attention is directed to the pleat spacer arrangement of U.S. Pat. No. 3,531,920, issued to C. G. Hart on Oct. 6, 1970 and to the spaced incremental spacer arrangement of U.S. Pat. No. 5,071,555, issued to K. Enbom on Dec. 10, 1991 wherein the spacer increments successively align in spaced relation between adjacent pleat flanks to space the same. Further attention is directed to the embossed spacer and dimple arrangements of the respective U.S. Pat. No. 5,290,447, issued Mar. 1, 1994, to H-J Lippold and U.S. Pat. No. 5,306,321, issued on Apr. 26, 1994, to R. J. Osendorf. Further attention is directed to the cartridge filter configuration of U.S. Pat. No. 5,427,597, issued to R. J. Osendorf on Jun. 27, 1995. Further, attention also is directed to the several different method arrangements for forming pleated filters as are disclosed in U.S. Pat. No. 5,804,014, issued to K. Kahler on Sep. 8, 1998; and to the four patents issued to Kyung-Ju Choi, namely, U.S. Pat. No. 6,159,318 on Dec. 12, 2000; U.S. Pat. No. 6,165,242, issued Dec. 26, 2000; U.S. Pat. No. 6,254,653, issued Jul. 3, 2001; and U.S. Pat. No. 6,398,839, issued Jun. 4, 2002. Finally, attention is directed to the several incremental pleat spacer arrangements disclosed in U.S. Patents issued to H. J. Lippold, namely: U.S. Pat. No. 5,028,331, issued on Jul. 2, 1991; U.S. Pat. No. 5,053,131, issued on Oct. 1, 1991; U.S. Pat. No. 5,066,319, issued on Nov. 19, 1991; U.S. Pat. No. 5,089,202, issued Feb. 18, 1992; and to Pub. No. U.S. 2002/003324 A1, published Mar. 21, 2002.

None of these aforedescribed several patents however discloses or even suggests the unified, unique, novel, straightforward, efficient and economical method and apparatus involving pleating and spacing adjacent successive flanks of adjacent pleats to provide uniformly extending selected V-shaped pleat spacing arrangements with selected geometric configurations and with a minimum of parts and a minimum of steps, optimizing performance characteristics with reduced pressure drops and even further effectively utilizing and inventively adding to the know-how of prior arrangements including, but not limited to, those set forth in the aforedescribed patents and co-pending patent application.

In accordance with the present invention, a unified, unique and novel filter arrangement including a method and product is provided to allow for efficient and low pressure drop fluid filtration operations—particularly air filtration—and for ready formation of selected planar and/or cylindrical geometric configuration with readily selected spacing arrangements between adjacent pleat flanks.

Various other features of the present invention will become obvious to one skilled in the art upon reading the disclosure set forth herein.

BRIEF SUMMARY OF THE INVENTION

More particularly the present invention provides a unique and novel method of manufacturing a pleated fluid filter including opposed upstream and downstream filter media faces comprising: feeding from a supply zone at least one layer of filter media to a scoring zone to provide spaced score lines on the layer of filter media; feeding the scored layer of filter media to a spacer application zone to selectively form thereon increments of material spaced in such a manner that the formed increments become communicatively facing when the scored layer of filter media is subsequently fed to a pleating zone; and, feeding the filter media with the selectively spaced and formed increments to a pleating zone to be pleated into a plurality of pleats successively spaced by the cumulatively facing increments, the pleating zone including reciprocating feed means to produce planar pleat flanks with minimum wave formation.

In addition, the present invention provides a unique pleated fluid filter arrangement comprising: at least one layer of fluid filter media pleated into a plurality of longitudinally extending adjacent opposed successive pleat flanks of selected depth and spacing between successive pleat flanks having minimal wave formation to provide spaced upstream and downstream filter face crests; the successive pleat flanks being spaced by communicatively facing increments of spacer formed material increments extending in selected lengths between the spaced upstream and downstream filter face crests.

It is to be understood that various changes can be made by one skilled in the art in the several steps of the inventive method and in the several parts of the unified inventive product as described herein without departing from the scope or spirit of the present invention. For example, steps other than as described herein can be employed in the formation of the fluid pervious filter media and in the composition and arrangement of the communicatively facing increments of spacer formed material including the shaping of the engaging surfaces of the facing increments of spacer formed material.

BRIEF DESCRIPTION OF THE DRAWINGS

Referring to the drawings which schematically disclose several embodiments of the present invention:

FIGS. 6 and 6A disclose plan views of two embodiments of portions of filter material including formed sets of spacer material increments, the facing increments being of substantially similar length and of substantially uniform cross-section in FIG. 6, and being of differing cross-section and in pleated form in FIG. 6A wherein the combined increments are tapered to provide tapered spacing with an overall geometric configuration conducive for use in the cartridge filter arrangement of FIG. 5;

FIGS. 7 and 7A disclose plan views of still another embodiment of a portion of filter material including formed sets of spacer material increments in cumulative overlapping condition;

FIGS. 8 and 8A disclose plan views of another embodiment of sets of overlapping cumulative facing formed spacer increments of similar cross-sectional thickness but of different lengths forming a geometrically planar-type filter arrangement;

FIGS. 9 and 9A disclose plan views of another embodiment of sets of selected overlapping cumulative facing formed spacer increments also of similar thickness but of different lengths capable of forming a geometrically cylindrical type filter arrangement;

FIG. 12 is a schematic flow diagram of still another structural embodiment of several steps which can be utilized in the present inventive method so as to produce the inventive product—this diagram including prepleating, straightening and subsequent reciprocating vertical feed pleating steps preceded by temperature treating steps;

FIG. 13 schematically discloses a pivotal inclined reciprocating feeding pleating arrangement, which can be substituted for the vertical pleating arrangement of FIG. 12;

FIG. 14 schematically discloses one horizontal pleating arrangement which also can be substituted for the vertical pleating arrangement of FIG. 12;

FIG. 15 schematically discloses still another horizontal pleating arrangement which can be substituted for the horizontal arrangement of FIG. 14; and, FIG. 16 is a schematic diagram disclosing a filter layer forming and scoring step, which can be utilized in filter layer scoring and forming spacer increments by filter media material displacement.

DETAILED DESCRIPTION OF THE DRAWINGS

Figure 1:
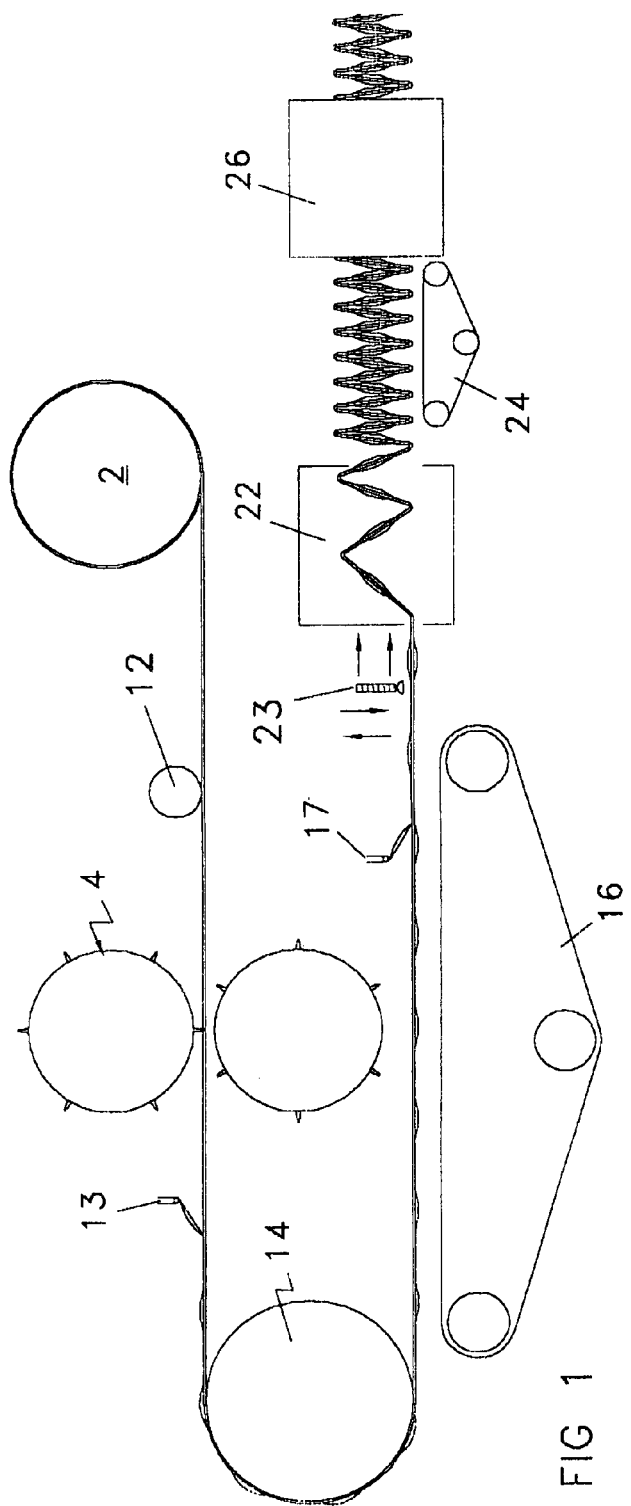
FIG. 1 is a flow diagram schematically disclosing structure utilized in carrying out one or more embodiments of the several steps of the inventive method to produce a unified inventive product.
Figure 2:
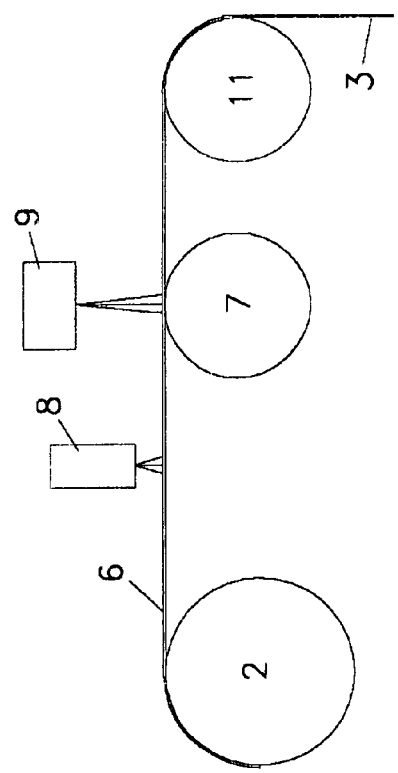
FIG. 2 is an additional flow diagram schematically disclosing a portion of the structure of a further arrangement of the present invention wherein filtration material fed from a supply roll is further treated as in the aforementioned related co-pending application before reaching the scoring zone of FIG. 1.

Referring to FIGS. 1 and 2 of the drawings two schematic flow diagram illustrations of the present invention are set forth, the schematic illustration of FIG. 2 further inventively complementing the inventive flow diagram illustration of FIG. 1.

Referring to FIG. 1 of the drawings, a supply roll 2 of a suitably selected fluid pervious filter media 3 is disclosed. Filter media supply roll 2 can be rotated by a suitably controllable motor (not shown), which feeds from a supply zone the suitable fluid layer of filter media 3 directly to a scoring zone 4. The fluid layer of filter media 3 can be any one of several types of fluid pervious air filtration media known in the air filtration art. In one advantageous embodiment of the present invention, the filter media 3 can be selected to be of a nature such as shown in aforementioned U.S. Pat. No. 7,097,684. In another such advantageous embodiment of the present invention, the filter media can be synthetic fibrous materials or synthetic materials in conjunction with a cellulose material.

Referring to FIG. 2 of the drawings, supply roll 2 can be positioned to feed a selected scrim layer, which can be of synthetic material or cellulose material also here designated by reference numeral 3, to the anvil roller 7 which serves as a forming zone. As in the aforementioned related patent application, scrim layer 3 functions as a downstream support layer and advantageously can be, wet-laid, dri-laid, spun bond or meltblown scrim material in the range of approximately scrim material is in the range of approximately forty (40) to two hundred (200) grams per square meter (g/sq. m.) and advantageously approximately sixty (60) to one hundred thirty (130) grams per square meter (g./sq. m.) in basic weight with a fiber size in the range of approximately seven (7) to one hundred (100) micrometers with a Gurley stiffness in the range of thirty (30) to five thousand (5000) grams and advantageously around two hundred (200) to one thousand (1,000) grams. It is to be understood that a suitable water repellent chemical additive can also be included in at least one layer.

As the downstream support scrim layer 3 (FIG. 2) moves to anvil roller 7 in the forming zone, to spaced, aligned turning guide roll 11—in a manner as set forth in the above referenced related co-pending application, it is minimally treated by spray mechanism 8 with a hot melt pressure spray of adhesive amorphous material. In one advantageous embodiment, the hot melt spray can selectively be a plastomer material such as polyethylene vinylacetate. From hot melt spray 8, an application of fine melt blown polypropylene filter media material of a relatively estimated selected weight, fiber size, thickness and porosity is applied in the forming zone 7 from a spinning source 9 to the hot melt sprayed scrim support layer 3. As in aforedescribed related co-pending application, spinning source 9 can advantageously be in accordance with anyone or more of melt blown processes heretofore identified in the specification and therefore not described in detail herein. It also is to be understood that scrim material 3 of FIG. 2 as described herein can be spray treated and formed in any one of the other forming embodiments disclosed in FIGS. 5-12 of the aforedescribed related co-pending applications and therefore not set forth in detail herein.

Once scrim filter media 3 has been formed in the manner as described for FIG. 2 herein or formed in the manner as described in FIGS. 5-12 (not shown herein) of the related above co-pending application, the formed filter media 3 is passed to aligned turning guide roller 11 and turning roller 12 to scoring zone 4 (FIG. 1 herein). In scoring zone 4, sharp scores are made on any one of the selected layers of filter media 3 as abovedescribed. These scores serve for pleating purposes by providing a series of spaced rows of spaced aligned scores, which extend laterally or transversely across selected filter media layer 3. The spacing of these rows of lateral, transversely spaced scores is selected to determine the depth of the subsequently formed pleats and, as in the above related co-pending application, in one embodiment of the invention the pleats can be of a depth of approximately three quarters (¾) inch or in other depth ranges depending upon the environment in which the inventively formed filter media is to be employed.

It also is to be understood that advantageously the formed scores are empirically or by relative estimation selectively and inventively of very small size to insure that the longitudinally extending upstream crests of subsequently formed pleats are desirably sharp and narrow in breadth so as to afford a minimum of crest resistance to a treated fluid stream. In this regard, the peak sharpness advantageously can be in the range of zero point zero one (0.01) to zero point two (0.2) inches, and, advantageously, the breadth of the crests can be less than zero point zero five (0.05) inches, depending upon the thickness of combined scrim and filter media layer 3.

From the scoring zone which includes opposed roller, scoring mechanism 4 (FIG. 1), the filter media layer 3 is passed along to a first spacer forming application zone 13 to turning guide roller 14 and over endless belt conveyor 16. It is to be noted that the turning guide rollers 11 (FIG. 2) and 14 (FIG. 1) are so spaced and positioned that both faces of filter media layer 3 can be accessible to spacer treatment by first pleat spacer pressure forming applicators 13 and second spacer pressure forming applicators 17 in the respective first and second increment application zones. From spacer applicator zones 13 and 17, the increment applied filter medium 3 is moved to pleating zone along endless conveyor belt 16 to pleating zone 22 where pleats are formed through a suitably powered "back and forth" or vertically "up and down" reciprocating feeding mechanism 23 such as an "up-down" vertically powered screw (schematically shown) or an endless conveyor belt. As can be seen in FIG. 1, the filter medium is shown as pleated in a flat pack and suitable portions thereof can be selectively severed and selectively mounted in border frames (not shown).

The high efficiency fluid filter material of the combined scrim and filter media layer 3 of FIG. 2, as in related co-pending application above mentioned, can have a desired minimum efficiency reporting value (MERV) of at least twelve (12) under ASHRAE standard 52.2-1999 at a minimum fluid flow pressure drop of approximately zero point two (0.2) inches of water gage at a fluid flow rate of approximately three hundred (300) feet per minute (ft./min.). The combined scrim and filter media layer 3 of FIG. 2 can be capable of capturing at least eighty (80) percent (%) or more of particle sizes in the range of one (1) to three (3) microns and at least (90) percent (%) of particle sizes in the range of three (3) to ten (10) microns in a treated fluid stream moving at approximately three hundred (300) feet per minute (ft./min.) for residential application and at approximately five hundred (500) feet per minute (ft./min.) for commercial and industrial applications.

As in the referenced U.S. Pat. No. 7,097,684, the strips in the first and second spacer application zones 13 and 17 can be formed from thermo-bondable plastic materials which can incorporate a small percentage by weight of calcium carbonate, clay, phosphate derivatives or halogenic derivatives to enhance flame retardency and reduce costs with spacing in the range of one (1) to four (4) inches. The thickness of the applied spacer materials in accordance with one feature of the present invention can be carefully selected so as to optimize pleat spacing and fluid resistance. As in U.S. Pat. No. 7,097, 684, in one advantageous embodiment of the present invention with pleat depth of three quarters ({fraction ¾)} inches, the adhesive spacers can have an optimum thickness of approximately zero point one (0.1) inches and advantageously, the peak sharpness can be in the range in zero point zero one (0.01) to zero point two (0.2) inches.

Referring to FIGS. 3-9A of the drawings of the present patent application, several further novel and unique advantageous embodiments of applying strip sets in the first and second spacer forming application zones 13 and 17 are disclosed. The principal features of these several disclosed embodiments are to insure a V-shaped fluid filter upstream or filter inlet opening between opposed pleat flanks to thus insure selected inlet fluid flow with minimal pressure drop and to allow for ready and selected geometric configuration of a finally assembled unit pleated filter either in selected planar or cartridge form.

Figure 3:
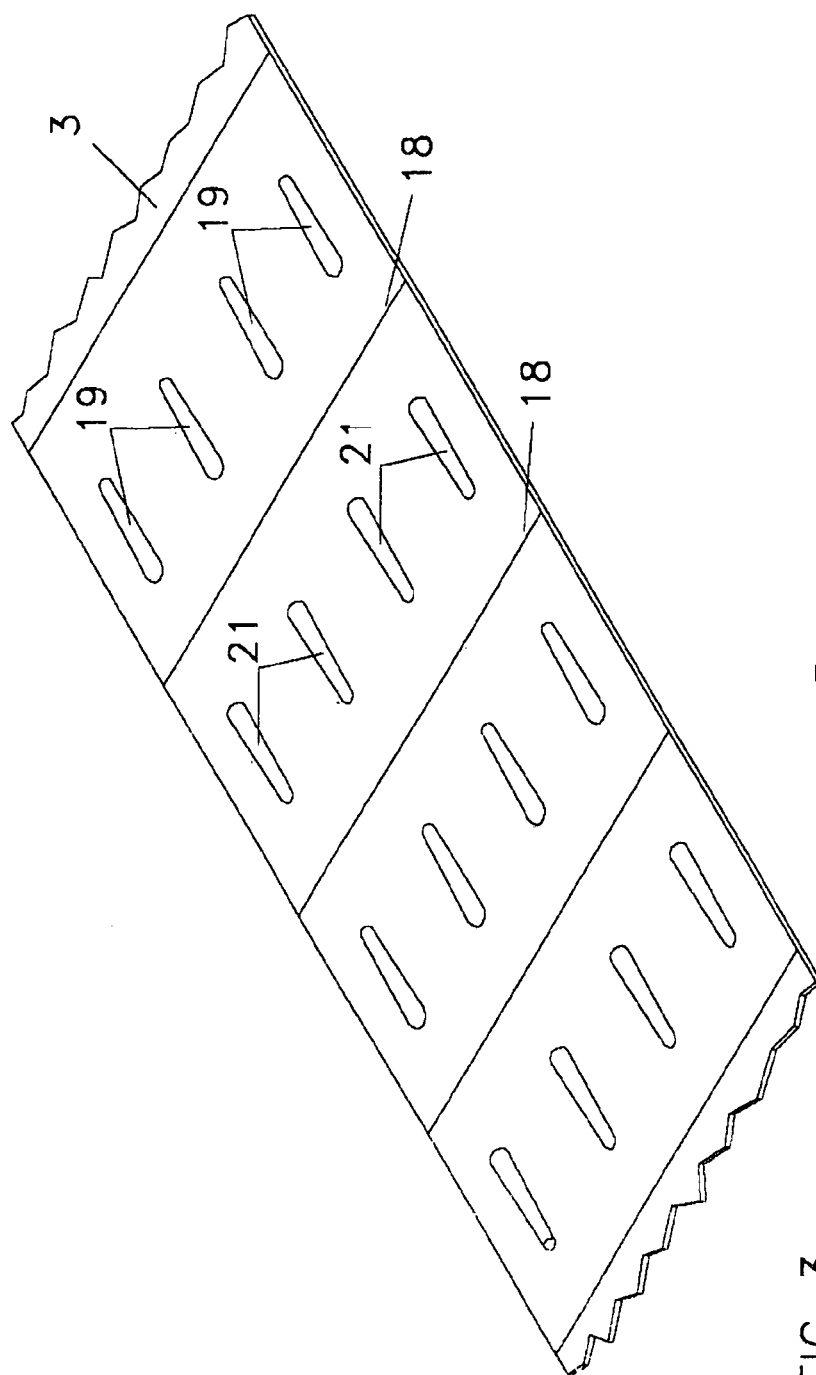
FIG. 3 is an isometric view of a portion of a sheet of filter media after it has passed both the scoring zone and the spacer material forming application zones.
Figure 4:
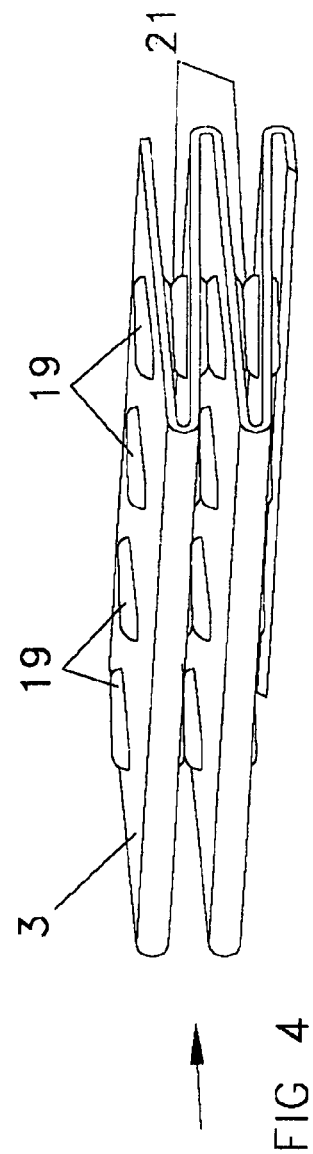
FIG. 4 is an isometric view of the portion of the sheet of filter media of FIG. 3 after it has passed the pleating zone, disclosing a portion of the sets of cumulatively facing formed spacer increments.

Referring to FIGS. 3 and 4 of the present drawings, schematically disclosed, spaced transverse score lines 18 on filter media 3 have disposed thereon normally thereto extending first and second sets 19 and 21 respectively of plastic strips with the strips or increments of each first set 19 being selectively positioned in spaced parallel relation to each other and with the strips of each set 19 having corresponding ends spaced a selected distance on one side of each transversely extending score line 18 and with the strips positionally extending parallel to fluid flow. Selectively disposed in spaced parallel and aligned relation on the other side of each transversely extending score line 18 is one second set of each of second sets 21 of plastic strips 21 with the strips or increments of each such set 21 being so positioned that it cumulatively faces increments 19 spaced on the other side of each score line 18. It is to be noted that the respective lengths, spacings and thicknesses of cumulatively facing strips 19 and 21 can be selectively adjusted to give a desired V-shaped opening of opposed pleat flanks in accordance with the destined use of the unit filters to be formed from the novel, unique pleated filter media. For example, the communicatively faced formed material increments can be of similar length sets with at least one certain select increment of a set being of different cross-section with at least one of combined facing increments being tapered so as to provide tapered spacing and an overall selective geometric configuration.

In still another embodiment of the invention, selected facing increments of the first and second sets can be arranged to overlap and/or be of differing cross-sectional breadths.

In this regard, attention once again is directed to schematically disclosed FIGS. 4-9A of the drawings of the present application. FIG. 4 shows a portion of selected fluid filter media 3—which can be of a composition as afore described—pleated in planar form with cumulatively facing formed increment sets 19 and 21 positioned in spaced, approximate relation to the upstream crests of the planar shaped geometric unit filter arrangement.

Figure 5A:
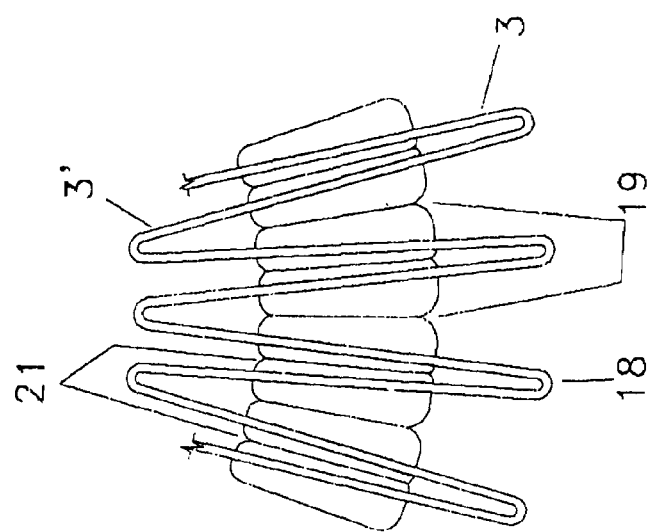
FIGS. 5 and 5A are portions of a geometrically formed cartridge-type filter arrangement embodiment also disclosing a portion of sets of the cumulatively facing formed increments spacers.
Figure 5:
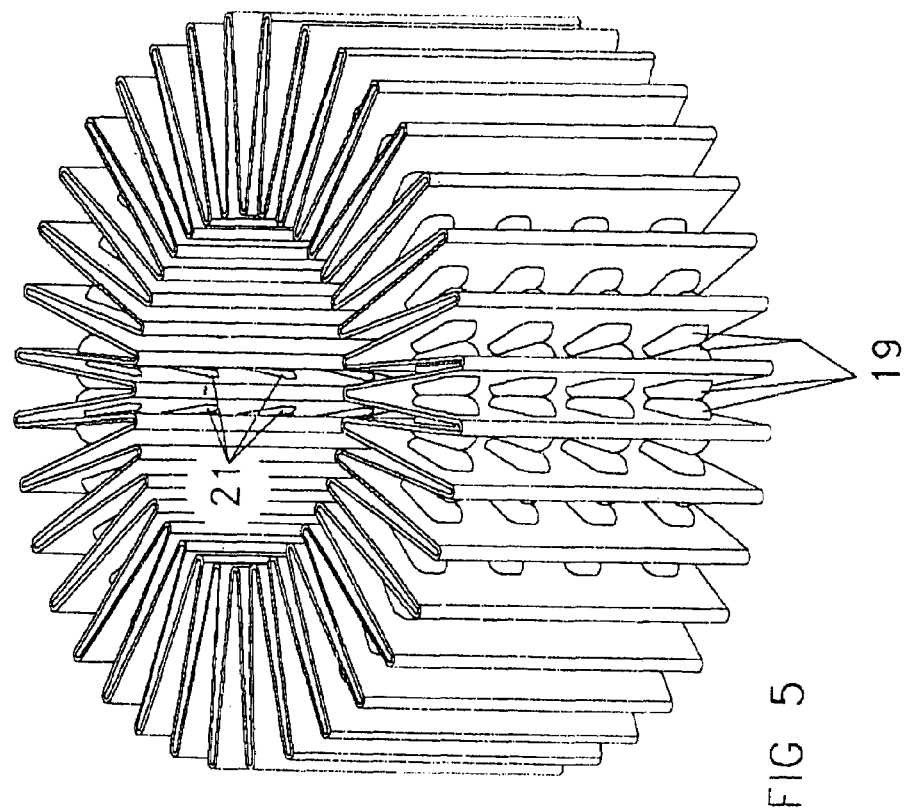

FIGS. 5 and 5A show a portion of the increment treated media of FIG. 3 geometrically configured in cartridge or annular form.

FIGS. 6 and 6A show cumulatively faced formed increment sets 19' and 21' of approximately similar length and cross-sectional thickness positioned relative score lines 18' to be intermediate the spaced V-shaped flanks of pleated fluid filter media 3' with the spacing and configuration selected to readily form a flat pack type as distinguished from a cartridge or annular fluid filter.

FIGS. 7 and 7A discloses sets of increments 19" and 21" of approximately like lengths positioned relative score lines 18" to be along the upstream and downstream crests of fluid filter media 3" with selected ends of increments 19" and 21" overlapping and positioned to form the opposed v-shaped flanks of pleated fluid filter medium 3".

FIGS. 8 and 8A disclose cumulatively facing sets of increments 19''' and 21''' of similar thickness but of different lengths in overlapping positioned relative scorelines 18''' to form spaced V-shaped flanks for a geometrically configured planar type fluid filter.

FIGS. 9 and 9A disclose still another type of overlapping communicatively facing sets of increments 19"" and 21"" of approximately similar thicknesses and different lengths positioned relative score lines 18" on filter media 3"" to form opposed v-shaped flanks for still another cartridge or annular type geometrically shaped unit filter arrangement.

Figure 11:
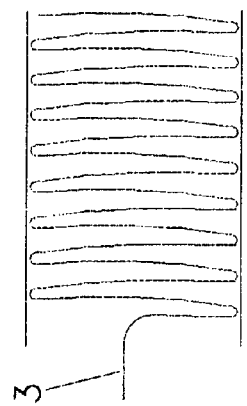
FIG. 11 is a schematic illustration in the pleating zone illustrating prior practices of feeding movement into the pleating zone from one fixed location intermediate the to be formed upstream and downstream pleat crests as the filter media is fed into the pleating zone which arrangement results in undesirable pleat flank waves and concomitant higher fluid treating pressured drops in such instances as clean air filtration.
Figure 10A:
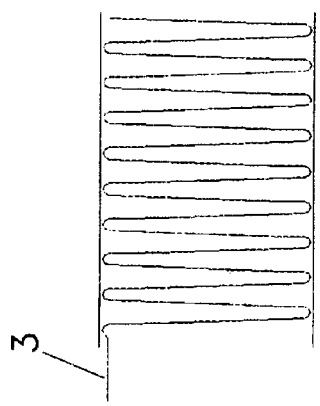
FIGS. 10A, 10B and 10C are schematic illustrations in the pleating zone illustrating the unique and novel feeding movement of the filter media as it is formed into pleats, the schematic feeding movement following a substantially "back and forth" or vertically "up and down" reciprocating feed motion pattern between the to be formed upstream and downstream pleat crests as the filter media is fed into the pleating zone so as to minimize undesirable pleat flank wave formation.
Figure 10B:
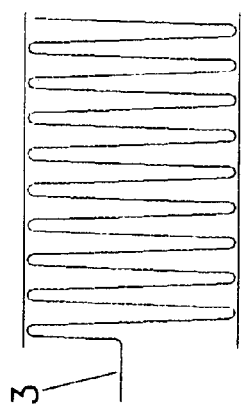
Figure 10C:
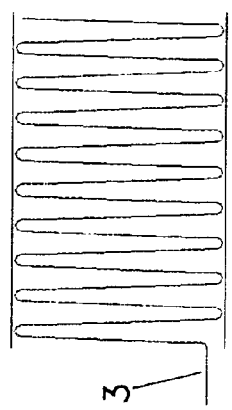

Referring to FIGS. 10A-10C and FIG. 11 of the present application, still another novel and unique feature of the present invention is schematically disclosed wherein it can be seen in FIGS. 10A- 10C and FIG. 11 that successive pleats along the faces of the pleated filter media 3 are fed into the pleating zone in a "back and forth" reciprocating motion between opposed media 3 faces and in the embodiment disclosed, the vertically reciprocating, "up-down" motion can be accomplished by a suitably acceptable vertical reciprocating mechanism 23 (FIGS. 10A-10C) to minimize wave contour formation as is illustrated by the prior art stationary feeding mechanism shown in FIG. 11 which prior art feeding mechanism creates pleat wave formation with concomitant undesirably increased pressure drop during filtering operations.

Again referring to FIGS. 3 and 4 of the drawings, once cumulatively overlapping sets of formed strips 19 and 21 have been applied in first strip or increment forming application 13 to one face of a selected filter media 3 in one of the selected manners above described and having been passed over schematically disclosed turning guide roller 14 (FIG. 1) and with the fluid filter media being carried by endless belt to second strip or increment forming application zones 17 where spaced sets of spaced, parallel strips or formed increment sets 19 and 21 are applied. The filter medium layer 3 with strip or increment applied formed strips 19 and 21 thereon are then moved toward pleating zone 22 where vertically reciprocating "up-down" (or "back-forth") feeding mechanism 23 (afore and hereinafter described) forms uniformly extending flat or planar (not wavy) V-shaped pleats.

As in above referenced U.S. Pat. No. 7,097,684, the pleated filter media layer 3 is then passed along endless conveyor belt 24 to a final cutting and assembly zone or station herein schematically shown as reference numeral 26. As afore described, flat packs of inventive filter media can be mounted in suitably selected border flames (not shown).

Referring to FIG. 12, which schematically discloses a further embodiment of the present invention, from supply roller 2 in the supply zone, selected filter media layer 3 of a combination as afore described is fed to scoring apparatus 4 in the scoring zone to a preheating zone 27 which preheats the scored layer 3 to a temperature in the approximate range of ninety (90)° F. to one hundred eighty (180)° F. degrees Fahrenheit. Scored filter layer 3 is then passed through a prepleating zone 28 and a post heating zone 29 which provides a temperature in the approximate range of one hundred (100)° F. to two hundred ninety (290)° F. degrees Fahrenheit. The prescored filter layer 3 is then passed through a pair of cooperating straightening rollers 31 to flatten the pleats in scored filter layer 3.

From cooperating rollers 31, a hot melt pressure application is applied in increment forming application zone 32 to opposed faces of scored filter layer 3 to form spacer increments of a selected shape such as aforedescribed. As before, the hot melt spray can be an adhesive amorphous material such as DuPont fluoro-chemical or some alternative material depending upon the chemistry of scored filter layer 3 and the shape and nature of use of the filter media.

With formed spacer increments applied to opposed faces of layer 3, the layer is then passed to a temperature control zone 33 which can operate in the approximate range of sixty (60°) to two hundred fifty (250°) degrees Fahrenheit. In this regard, it is to be noted that the selected temperature at zone 33 is held at a level sufficient to avoid crystallization of the spacer increments on opposed faces of filter layer 3 when it is passed to subsequent pleating zone 34.

As shown in FIG. 12, pleating zone 34 is in the form of a vertically disposed, "back and forth" reciprocating pleat receiving channel so as avoid waving of the pleat flanks as above described for FIG. 10.

In this regard, schematically communicatable with the vertical pleating zone 34 is a second vertically disposed horizontally reciprocable pleat receiving and cut-off reception channel 36. Reception channel 36 is provided with a pressure yieldable platen 37. Platen 37 is vertically movable within reception channel 36 against compressible helical coil-like spring 38. When channel 36 is reciprocally moved to a position below the vertical pleat receiving channel in pleating zone 34, it receives a portion of pleated and spaced filter media layer 3 to be severed as a pleated filter unit for further assembly (not disclosed). It is to be understood that other pressure yielding arrangements such as a hydraulic piston could be utilized instead of compressible coil spring 38.

FIGS. 13 and 14 schematically disclose two alternative pleating arrangements 39 and 41 which can be utilized in place of the vertical arrangement of FIG. 12. In FIG. 13, pleating arrangement 39 is in the form of an inclined, reciprocating endless belt pivotable from inclined to horizontal position and in FIG. 14 a horizontally disposed pleating arrangement 41 is shown, which can utilize a pair of spaced reciprocating pleating arms (not shown but long known in the media pleating art).

FIG. 15 discloses still another pleating arrangement which can be utilized where in filter media feed rollers (47) can be arrange to reciprocate in simultaneously combined cooperative "up and down" feed relation to minimize undesirable pleat flank wave formation.

Figure 16:
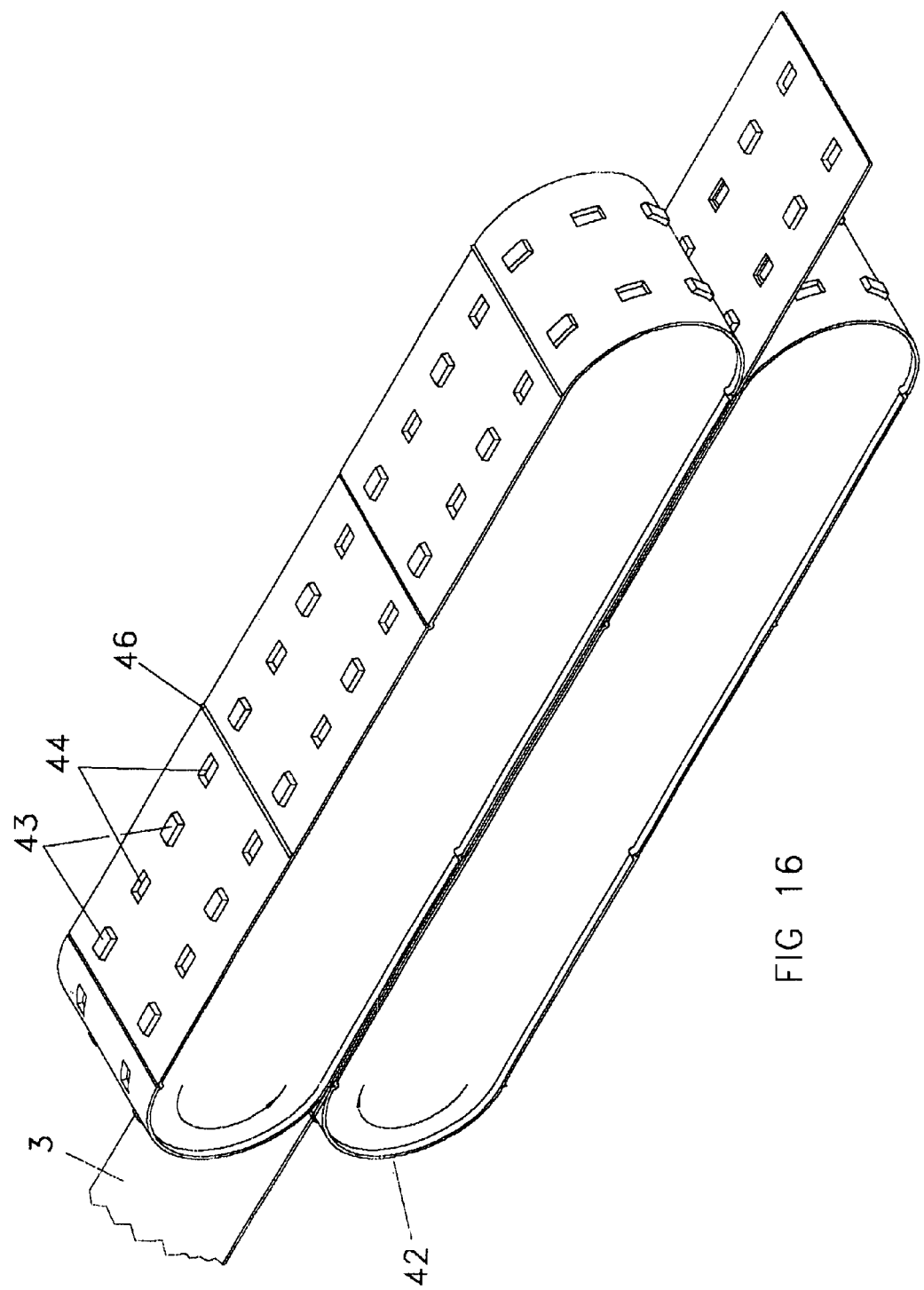

Finally, FIG. 16 shows an alternative spaced increment forming arrangement including a pair of cooperative mating upper and lower endless belts 42. Each belt carries an arrangement of spaced increment forming successive male and female media displacing members 43 and 44 and media scoring knives 46. As a filter media layer 3 is passed through the mating belt pair 42 displacing members 43 and 44 pressingly displace or emboss the media to form the cooperative spacer increments for the pleated media 3.

The invention claimed is:

1. A pleated fluid filter arrangement comprising: at least one layer of fluid filter media pleated into a plurality of longitudinally extending adjacent opposed successive pleat flanks of selected depth and spacing between successive pleat flanks to provide spaced upstream and downstream filter face crests; each of said successive pleat flanks comprising a single plane having a first side and a second side manufactured to have minimal wave formation and being spaced by pairs of engaging adhesive increments of formed material of selected length applied to opposed sides of said successive pleat flanks that directly engage each of said first and second sides of each of said single plane at preselected distances from said filter face crests, said flank planes adjacently extending with said selected lengths centrally oriented between and spaced from said spaced upstream and downstream filter face crests, said first side having at least one of said adhesive increments of formed material and said second side having at least one of said formed material adhesive increments wherein said at least one of said adhesive increments of a first side of one of said successive pleat flanks engages said at least one said adhesive increments of second side of an adjacent said successive pleat flank each increment of said pair of adhesive increments having a longitudinal axis, said pair of longitudinal axes being substantially aligned on said at least one layer of fluid filter media.

2. The pleated fluid filter arrangement of claim 1, said increments of said spaced formed material increments being selected from a fluid pliable adhesive.

3. The pleated fluid filter arrangement of claim 1, said engaging increments of said formed material being of selected thickness so that the distance between adjacent successive pleat flanks and between said spaced upstream and downstream filter face crests is substantially equal.

4. The pleated fluid filter arrangement of claim 3, said adjacent successive pleat flanks being of a substantially uniform level geometric configuration to minimize wave formation and to minimize fluid pressure drop between said spaced upstream and downstream media faces during filtering operations.

5. The pleated filter arrangement of claim 1, said fluid filter media comprising at least one layer of selected scrim material serving as a support layer and a selected fine synthetic filter media material applied to said selected scrim material.

6. The pleated filter arrangement of claim 5, said scrim material is in the range of approximately forty (40) to two hundred (200) grams per square meter (g/sq. m.) in basic weight with a fiber size in the range of approximately seven (7) to one hundred (100) micrometers with a Gurley stiffness in the range of thirty (30) to five thousand (5000) grams.

7. The pleated filter arrangement of claim 5, wherein said scrim material includes with a selected hot melt spray of adhesive amorphous material and said filter media material is of a relatively estimated selected weight, fiber, thickness and porosity when applied to said hot melt spray coating.

8. The pleated filter arrangement of claim 5, wherein said at least one layer of filter media is of synthetic fibrous material.

9. The pleated filter arrangement of claim 8, wherein at least one layer of filter media is of cellulose material.

10. The pleated filter arrangement of claim 5, wherein at least one selected scrim layer has been fed to said forming zone as a downstream support layer and a selected fine synthetic filter media material has been applied thereto.

11. The pleated filter arrangement of claim 10, wherein said downstream support layer includes synthetic material.

12. The pleated filter arrangement of claim 10, wherein said downstream support layer is of wet-laid material.

13. The pleated filter arrangement of claim 10, wherein said downstream support layer is of cellulose material.

14. The pleated filter arrangement of claim 10, wherein said downstream support layer is of dri-laid material.

15. The pleated filter arrangement of claim 10, wherein said downstream support layer is of spunbond material.

16. The pleated filter arrangement of claim 10, wherein said the selected fine synthetic filter media is of meltblown material.

17. The pleated filter arrangement of claim 16, wherein said the selected fine synthetic filter media being is meltblown material with a selected additive.

18. The pleated filter arrangement of claim 17, wherein said additive is a fluoro chemical additive to provide water repellency.

19. The pleated filter arrangement of claim 1, said pair of engaging increments being in the form of substantially similar length first and second sets with at least one of said sets having a substantially uniform cross-section with at least one certain select increment of said other set being of differing cross-section wherein at least one certain pair of said pair of engaging increments is tapered to provide tapered spacing and an overall geometric configuration conducive to a select geometric configuration.

20. The pleated filter arrangement of claim 1, said engaging formed material increments being in first and second sets with at least selected increments of at least one set overlapping with respect to selected pleat crests of said other set.

21. The pleated filter arrangement of claim 1, said engaging formed material increments being in first and second sets with at least selected formed material increments of one set differing in length from at least one of the lengths of the other of said sets.

22. The pleated filter arrangement of claim 1, said engaging formed material increments being in first and second sets with at least one of said formed material increments of one set differing in cross-sectional breadth from a cross-sectional breadth of at least one of said other formed material increment of said other set.

23. The pleated filter arrangement of claim 1, said engaging formed material increments being pressure displaced increments.

24. The pleated filter arrangement of claim 1 wherein said plurality of longitudinally extending adjacent opposed successive pleat flanks have said spaced formed material increments on alternating pleat flanks between said upstream and downstream filter face crests.

25. The pleated filter arrangement of claim 1 wherein said plurality of longitudinally extending adjacent opposed successive pleat flanks have said formed material increments on either said pleat flanks between said downstream filter face crests or said pleat flanks between said upstream filter face crests.

26. The pleated filter arrangement of claim 1 wherein a succession of transverse score lines in a fluid filter material form said filter face crests between said longitudinally extending adjacent opposed successive pleat flanks, said engaging increments of formed material increments being disposed in spaced parallel and aligned relation normal to said transverse score lines and parallel to fluid flow.

27. The pleated fluid filter arrangement of claim 1 wherein said engaging increments are aligned in a direction substantially perpendicular to score lines.

28. A pleated fluid filter arrangement comprising: at least one layer of fluid filter media pleated into a plurality of longitudinally extending adjacent opposed successive pleat flanks of selected depth and spacing between successive pleat flanks to provide spaced upstream and downstream filter face crests; said successive pleat flanks having a singularly planar configuration formed in a pleating zone with a back and forth reciprocating motion of a reciprocating mechanism between opposed media faces so as to have minimal wave contour formation and being spaced by pairs of engaging adhesive increments of selected length of formed material adjacently extending with said selected lengths centrally oriented between and spaced from said upstream and downstream filter face crests, each of said pairs of increments having a first end and a second end wherein one of said first and second ends is wider than the other of said first and second ends in a direction parallel to said filter face crests, said pairs of increments of formed material being directly adhered to each of the opposed planar surfaces of said adjacent opposed successive pleat flanks so that each of said successive pleat flanks has a first face and a second face and each of said first face and said second face has one of said adhesive increments of formed adhesive material adhered directly thereto, said pairs of engaging increments being longitudinally aligned and normal to said filter face crests.

* * * * *